(12) United States Patent
Yajima

(10) Patent No.: US 7,483,720 B2
(45) Date of Patent: Jan. 27, 2009

(54) PORTABLE TERMINAL WITH DISPLAY

(75) Inventor: Takayuki Yajima, Yokohama (JP)

(73) Assignee: Kyocera Corporation, Fushimi-ku, Kyoto-shi, Kyoto (JP)

( * ) Notice: Subject to any disclaimer, the term of this patent is extended or adjusted under 35 U.S.C. 154(b) by 3 days.

(21) Appl. No.: 10/671,310

(22) Filed: Sep. 25, 2003

(65) Prior Publication Data
US 2004/0132512 A1 Jul. 8, 2004

(30) Foreign Application Priority Data
Sep. 26, 2002 (JP) .............................. 2002-281913

(51) Int. Cl.
H04B 1/38 (2006.01)
H04M 1/00 (2006.01)

(52) U.S. Cl. ................... 455/566; 455/90.1; 455/550.1; 455/556.1; 455/556.2; 455/575.1

(58) Field of Classification Search ................ 455/466, 455/556.1–556.2, 557–558, 575.1, 575.2, 455/575.3–575.4, 566–567, 90.2, 90.3, 90.1, 455/347, 550.1, 575.8; 345/7–9, 164, 168–169, 345/173; 340/7.39, 7.4, 7.41, 7.63; 349/58
See application file for complete search history.

(56) References Cited

U.S. PATENT DOCUMENTS

| | | | |
|---|---|---|---|
| 5,710,576 A * | 1/1998 | Nishiyama et al. .......... 345/169 |
| 5,900,848 A * | 5/1999 | Haneda et al. ................ 345/1.1 |
| 6,009,336 A | 12/1999 | Harris et al. |
| 6,094,565 A * | 7/2000 | Alberth et al. ............ 455/575.3 |
| 6,658,272 B1 * | 12/2003 | Lenchik et al. .............. 345/164 |
| 6,721,420 B1 * | 4/2004 | Kubo et al. ............. 379/433.13 |
| 6,819,947 B2 * | 11/2004 | Okuda et al. ............. 455/575.3 |
| 6,839,101 B2 * | 1/2005 | Shima .......................... 349/58 |
| 6,907,276 B2 * | 6/2005 | Toba .......................... 455/566 |
| 2002/0119768 A1 * | 8/2002 | Matsumoto et al. ......... 455/412 |

FOREIGN PATENT DOCUMENTS

| | | |
|---|---|---|
| CN | 1170329 A | 1/1998 |
| JP | 2001-292213 | 10/2001 |
| JP | 2001-298513 | 10/2001 |
| JP | 2002-152347 | 5/2002 |
| JP | 2002-158758 | 5/2002 |
| JP | 2003-258951 | 9/2003 |

OTHER PUBLICATIONS

Chinese Office Action dated Dec. 10, 2004.
Japanese Office Action dated Apr. 10, 2007 with English translation.

* cited by examiner

*Primary Examiner*—Meless N Zewdu
(74) *Attorney, Agent, or Firm*—Schulte Roth & Zabel LLP; John C. Garces (57) ABSTRACT

A portable terminal includes a first housing having at least a display unit and a second housing having at least an input unit. The housings are openably and closably connected together so that the display unit is visible to the user in at least a closed state. The portable terminal also includes a detecting device for detecting an opening action of either of the housings and a control device for controlling a screen of the display unit. When the detecting device detects an opening action of either of the housings, the control device changes the screen of the display unit to an input screen.

19 Claims, 10 Drawing Sheets

PORTABLE TERMINAL WITH DISPLAY

CROSS REFERENCE TO RELATED APPLICATION

This application claims all rights of priority to Japanese Application No. 2002-281913, filed Sep. 26, 2002 (pending).

BACKGROUND OF THE INVENTION

The present invention relates to a portable terminal such as a portable telephone or PDA.

In recent years, portable telephones are being used as high function terminals for accessing the Internet, mailing, displaying dynamic and static images, managing schedules and the like, in addition to being used as telephones. Keeping pace with providing these high functions in portable telephones has been the colorization of display units of portable telephones, the increase in resolution of display units, and the manufacture of large screen display units.

In order to provide a large screen display unit without sacrificing portability, the structure most commonly employed recently in portable telephones, which are representative of portable terminals, is one in which a display unit housing and an input unit housing are constructed so as to be able to fold open and shut around a hinge portion. In such portable telephone, the display unit housing houses the display unit and the input unit housing houses character input and operating keys such as the ten-keys and function keys.

However, in a folding portable telephone such as the one described above, when the two housings are folded shut (i.e., are in a closed state) the display unit is hidden inside the two folded shut housings. Therefore, when a message, mail or the like is received it is necessary to open the two housings and expose the display unit to the outside.

In order to solve this type of problem in the folding portable telephone, Japanese Patent Application Laid-Open (JP-A) No. 2002-158758, for example, discloses a portable electronic instrument with a rotation mechanism, wherein the display unit is visible to the outside in a closed state. In this closed state the display unit housing, in which the display is provided, is superimposed on the input unit housing, in which character input and operating keys are provided. In addition, JP-A No. 2001-292213, for example, discloses a structure in which, by using an opening and closing radio communication device that has a slide mechanism, the display unit is visible to the outside in a state in which the two housings are superimposed in the same manner as above (i.e., in a closed state).

Here, it should be noted that regardless of whether the structure of the portable terminal includes a slide mechanism, a rotation mechanism, or a folding mechanism, a state in which the display unit housing is superimposed on the input unit housing is referred to below as a "closed state." In contrast, the state in which the two housings are slightly opened, moderately opened or completely opened from this closed state is referred to below as an "open state".

It should also be noted that above described portable terminals having displays visible to the outside in the terminal's closed state also allow a user to read mail and confirm received messages, unlike a conventional folding portable telephone. Therefore, it might be concluded that the only reasons for the portable terminal to be placed in an open state would be for inputting characters or for having a telephone conversation.

As can be seen from the above description, the portable terminal may be switched from a closed state to an open state in order to input characters, for example, in an address book or to compose a mail. When the terminal is switched, the character input operation unit such as a ten key gets exposed to the outside. However, in currently available portable terminals, it is often necessary to operate a hierarchical menu subsequently to (or prior to) the portable terminal being placed in an open state so as to set the portable terminal in a character input state (for example by selecting "Compose new" or "Edit"). Consequently, a user has to perform a menu setting operation together with an opening operation.

BRIEF SUMMARY OF THE INVENTION

It is an object of the present invention to provide a portable terminal that allows unnecessary operations to be omitted by automatically switching (including mode switching) to an input screen in accordance with an opening operation that is required for character input. It is another object of the present invention to provide a portable terminal that is user friendly.

In general, in a first aspect, the invention features a portable terminal including a first housing having at least a display unit and a second housing having at least an input unit, wherein both housings are openably and closably connected together such that the display unit is visible to the user in at least a closed state. The portable terminal further includes a detecting device for detecting an opening action of either housing and a control device for controlling a screen of the display unit. When the detecting device detects an opening action of either housing, the control device changes a screen on the display unit to an input screen.

The portable terminal may be further provided with a selecting unit for selecting an item displayed on the display unit. When the detecting device detects an opening action of either housing, the control device changes a screen with an item selected thereon by the selecting unit to an input screen corresponding to the selected item.

Note that the portable terminal may be a personal digital assistant (PDA) or a portable telephone.

In general, in a second aspect, the invention features a portable terminal including a first housing having at least a display unit and a second housing having at least an input unit, wherein both housings are openably and closably connected together so that the display unit is visible to the user in a closed state and an opened state, and the input unit is visible to the user in an open state. The portable terminal further includes a detecting device for detecting an opening action of either housing and a control device for controlling a screen of the display unit. When the detecting device detects an opening action of either housing, the control device changes a screen on the display unit to an input screen.

Note that the portable terminal may be a personal digital assistant (PDA) or a portable telephone.

In general, in a third aspect, the invention features a portable terminal including a first housing having at least a display unit and a second housing having at least an input unit, wherein both housings are openably and closably connected together so that the display unit is visible to the user in a closed state. The portable terminal further includes a detecting device for detecting an opening action of either housings, and a control device for switching between a non-input mode and an input mode. When the detecting device detects an opening action of either housing, the control device switches the mode from the non-input mode to the input mode.

In general, in a fourth aspect, the invention features a portable terminal including a first housing having at least a display unit and a second housing having at least an input unit, wherein both housings are openably and closably connected together so that the display unit is visible to the user in a closed state. The portable terminal further includes a detecting device for detecting an opening action of either housing, a reception device for receiving e-mail, and a control device for displaying the received c-mail on a screen of the display unit and changing a screen of the display unit. When the detecting device detects an opening action of either housing, the control device changes from a non-input screen displaying the received e-mail to an input screen for composing a reply based on the received e-mail.

In addition to changing the non-input screen displaying the received e-mail to the input screen for composing a reply based on the received e-mail, the control device may also cause the received e-mail to be displayed on the input screen.

In general, in a fifth aspect, the invention features a method of displaying an input screen of a display unit of a portable terminal having housings openably and closably connected together. The method includes the steps of selecting an item to be displayed on the display unit in a closed state, and changing a non-input screen with the selected item thereon to an input screen corresponding to the item when either housing is opened from a closed state by a user.

This method of displaying the input screen may further include providing a non-input screen having a guide display in order to inform a user to open either housing from a closed state.

In general, in a sixth aspect, the invention features a method of displaying an input screen of a display unit of a portable terminal having housings openably and closably connected together. The method includes the steps of receiving an e-mail, displaying the received e-mail on a non-input screen of the display unit, and changing the non-input screen displaying the received e-mail to the input screen for composing a reply based on the received e-mail when either housing is opened from a closed state by a user.

This method of displaying the input screen may further include providing a non-input screen having a guide view in order to inform a user to open either housing from a closed state.

The opening action of either housing that is detected by the detecting device is a detection of an action occurring due to the change of state of the portable terminal from a "closed state" to an "open state." The opening action that is detected may be, for example, an action in which a housing is slightly opened from the closed state, an action at any stage during the process of opening of either housing, or a conclusion of a full opening of either housing. A switch mechanism or sensor may be used to detect these housing actions.

The portable terminal of the present invention includes code division multiple access (CDMA) models, personal digital cellular (PDC) models, personal hand-phone system (PHS) models and the like. The portable terminal of the present invention also includes portable information terminals known as personal digital assistants (PDA). When present invention is applied to a PDA, such PDAs include those that incorporate a communication device and those that allow an external communication device to be connected thereto.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE INVENTION

A description will now be given using the drawings based on an embodiment of a portable telephone as an example of the portable terminal of the present invention.

Figure 1:
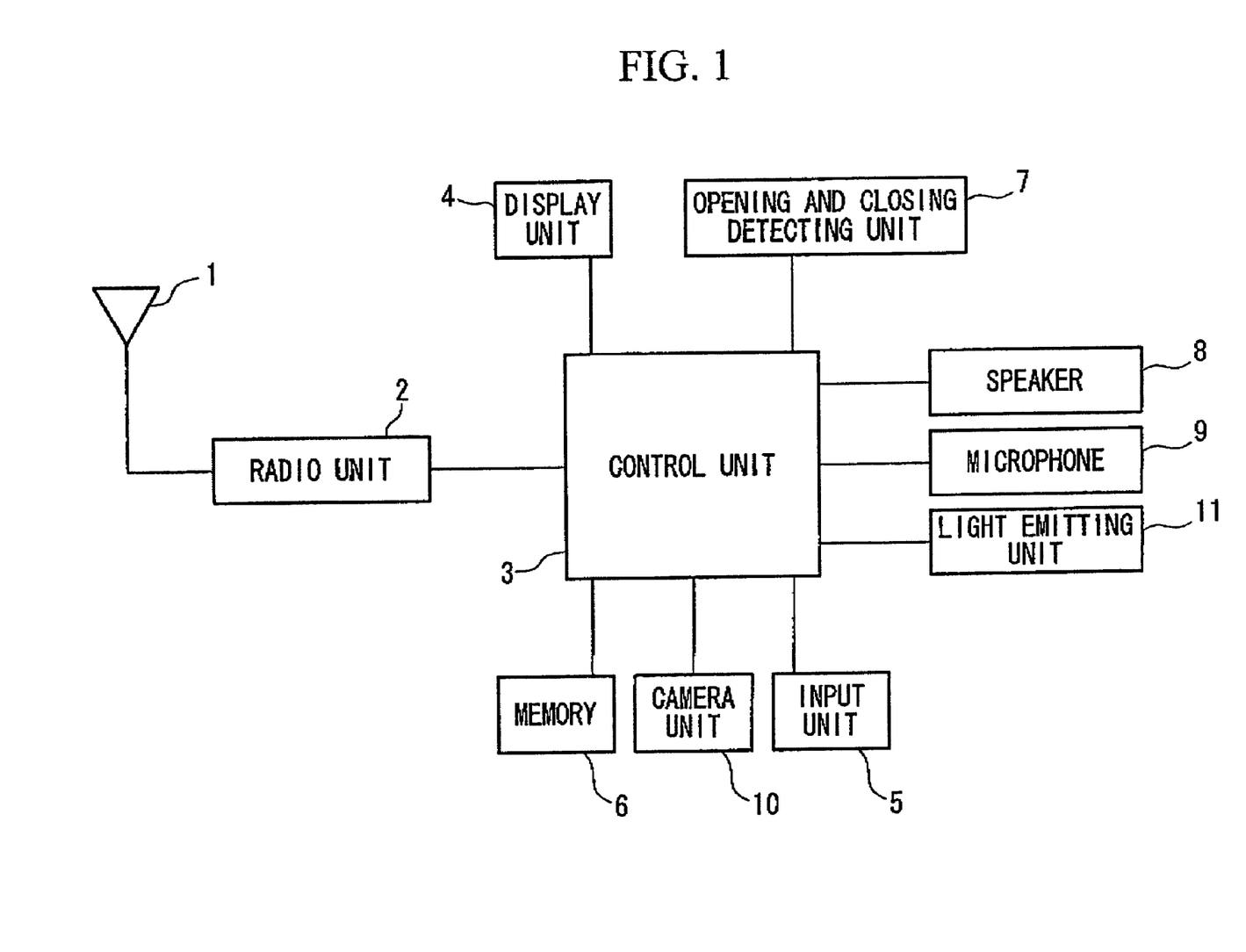
FIG. 1 is a block diagram schematically illustrating the structure of main components of a portable telephone in accordance with an embodiment of the present invention.

FIG. 1 schematically illustrates the structure of main components of the portable telephone of one embodiment of the present invention.

FIG. 2 shows external views of the portable telephone of the embodiment of the present invention. FIG. 2A shows the front of a portable telephone in a closed state. FIG. 2B shows a side of the portable telephone in a closed state. FIG. 2C shows the front of the portable telephone in an open state. FIG. 2D shows the back of the portable telephone in an open state. The portable telephone of the present embodiment has a structure in which a first housing 12 is provided with a display unit 4, and a second housing 13 is provided with an input unit 5c such as a ten-key or a keyboard used for inputting characters. Housings 12 and 13 are connected by a connection portion (not shown) such that both housings revolve around the connection portion.

The portable telephone includes an antenna 1, a radio unit 2, a control unit 3, a display unit 4, an input unit 5, a memory 6, an opening and closing detecting unit 7, a speaker 8, a microphone 9, a camera unit 10, and a light emitting unit 11.

Radio unit 2 (i.e., reception device) receives radio signals via antenna 1, demodulates the received signals into data, and sends the data to control unit 3.

Radio unit 2 also modulates data received from control unit 3 into radio signals and transmits the radio signals are via antenna 1.

Control unit 3 (i.e., control device) determines the display content of display unit 4 in accordance with reception signals received by radio unit 2 or a key input received from the input unit 5. When a received signal is detected, control unit 3 displays the sender information on display unit 4. When reading instruction command for a menu program or function programs of any kind is detected, as a result of an input from input unit 5, control unit 3 displays content in accordance with the reading instruction command. Note that control unit 3 preferably controls processing such as screen switching or mode switching in accordance with an opening action of either housing.

Display unit 4 displays data and menus and the like and is formed, for example, by a liquid crystal display (LCD). Display unit 4 is preferably visible to the user both when the portable telephone is in a closed state, shown in FIG. 2A, and in an open state, shown in FIG. 2C.

As shown in FIGS. 2A-2D, input unit 5 (i.e., the selecting unit) includes a 3-directional lever key 5a and a side key 5b that are exposed to the outside. Input unit 5 further includes input keys 5c such as a ten-key or a cursor key used for character input. Input keys 5c are preferably not exposed to the outside in a closed state. As would be appreciated by a person skilled in the art, input keys 5c are not limited to those shown in this embodiment and may also include a keyboard or the like. In accordance with the preferred embodiment, input unit 5 of the second housing for performing character input shows input keys 5c that are not exposed to the outside when the portable terminal is in a closed state. (as can be seen from FIG. 2A) Input unit 5 operates to select and enter items displayed on display unit 4.

Memory 6 (i.e., storage device) is formed by ROM, RAM. EEPROM, or the like and stores data such as a history of sent and received messages, mail, an address book (i.e., telephone book), dynamic images and static images, schedules and the like. It also stores programs and similar instructions required by the portable telephone. Input screens corresponding to the items described below (various menus such as address book, mail, memo pad, and schedule as well as the selection conditions of the cursor within the menus) are also stored in memory 6. For example, when mail addresses in the address book registration data are displayed, a "Compose new mail screen" message is shown. When the mail reception history is displayed a "Compose reply mail screen" is shown. When schedule data is displayed, an "Edit schedule screen" message is shown. And when memo pad registration data is displayed, an "Edit memo pad screen" message is shown.

Opening and closing detecting unit 7 (i.e., the detecting device) detects an opening action and closing action of the portable telephone and outputs a signal to control unit 3 when these actions are detected. Therefore, opening and closing detecting unit 7 detects a "closed state" and "open state" of the portable telephone by detecting these actions. Note that the opening action includes, for example, an action by which a housing is slightly opened from a closed state, an action at any stage during the process of opening of either housing, and an action by which both housings have been fully opened up. Similarly to the detection of the opening action, the closing action includes, for example, an action by which a housing is slightly closed from the opened state, an action at any stage during the process of closing of either housing, or an action by which both housings have been fully closed. Opening and closing detecting unit 7 may be formed as a switch mechanism or a sensor.

Figure 2A:
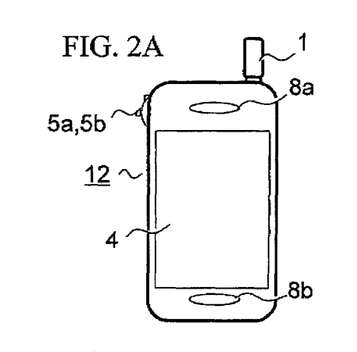
FIGS. 2A to 2D are external views of the portable telephone in accordance with an embodiment of the present invention.
Figure 2B:
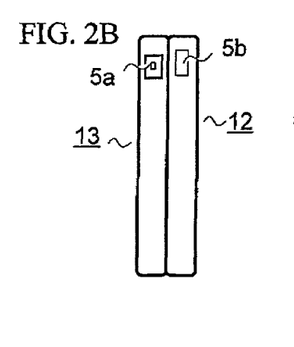
Figure 2C:
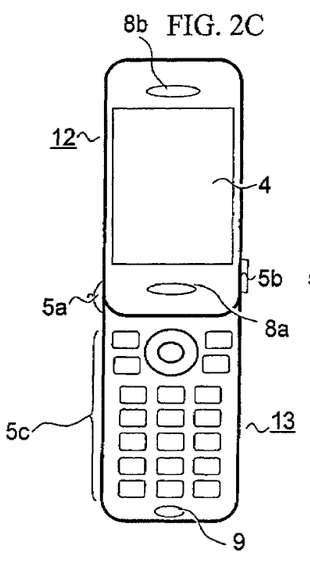
Figure 2D:
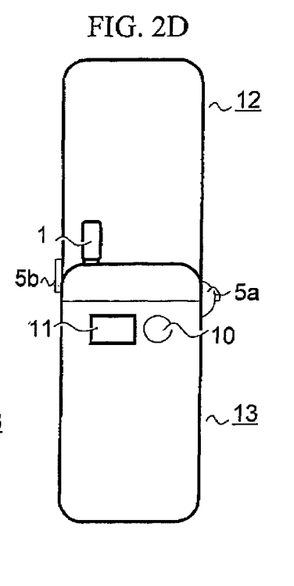

As shown in FIGS. 2A and 2C, in the present embodiment, speaker S includes a speaker 8a that is preferably used in the closed state and a speaker 8b that is preferably used in the open state. It is thus possible to conduct a telephone conversation with the portable telephone in the closed state.

Microphone 9 picks up a users voice during a telephone conversation or peripheral sound when dynamic images are being filmed.

Camera unit 10 is formed by an image pickup lens, a charge-coupled device (CCD), an image pickup circuit and the like, and picks up images of a photographed object.

Light emitting unit 11 is preferably a flash used when images are being filmed, and outputs an artificial, momentary intense light when images are being filmed at night or in a location where there is an insufficient quantity of light.

Next, a detailed description will be given using a flowchart and screen transition drawings of a feature of the present invention. Namely, the description relates to an example of an action when a display screen of the display unit changes from a viewing screen to an editing screen for the input of characters and the like based on the opening action described above.

An example of the operation for using the mail function, that is an embodiment of the present invention, will now be described in detail using the operation flowchart shown in FIG. 3 and display screen transition drawings shown in FIG. 4.

Figure 3:
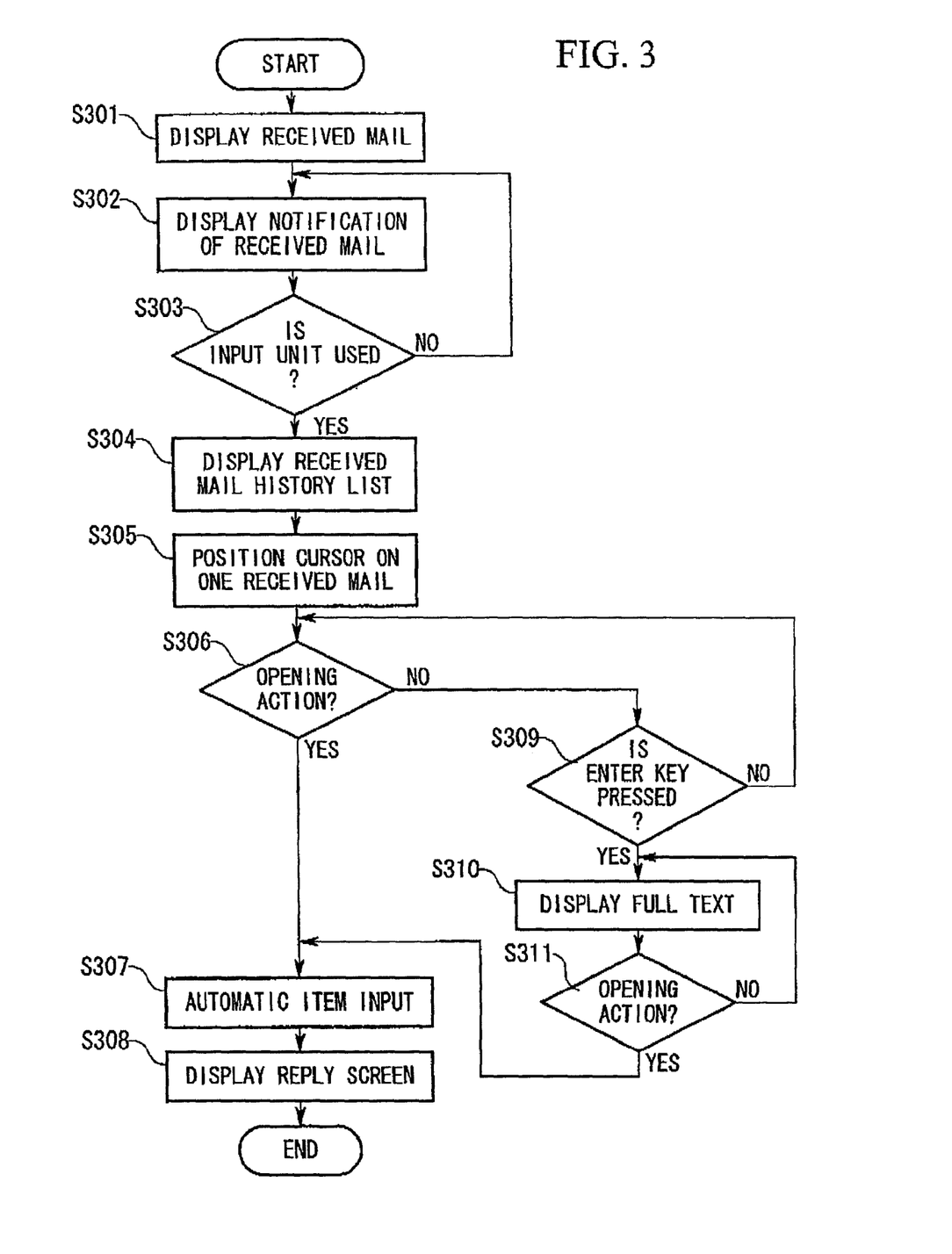
FIG. 3 is an operation flowchart for using mail function.
Figure 4A:
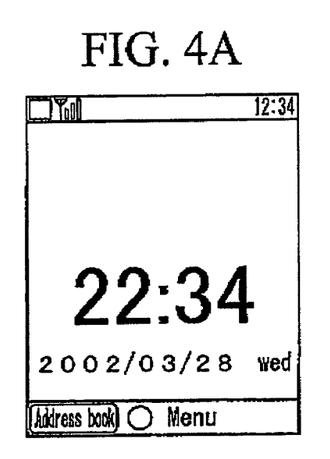
FIGS. 4A to 4F are transition diagrams of display screens displayed when mail is being read.
Figure 4B:
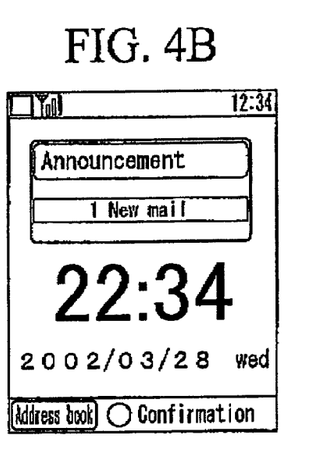
Figure 4C:
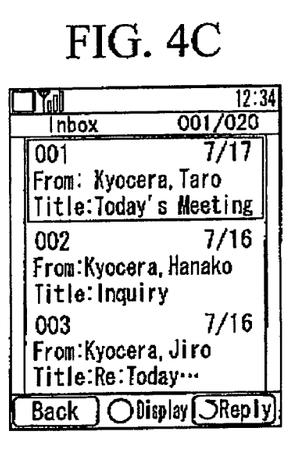

When control unit 3 detects that mail has been received in a closed state of portable telephone (FIG. 4A), control unit 3 performs reception processing and displays "1 new email" on display unit 4 (FIG. 3: S301, S302; FIG. 4B). When a user is alerted to the arrival of mail by this display, the user operates the 3-directional lever key 5a and performs an operation to confirm the newly received mail. Based on this operation, control unit 3 displays a mail reception history list on display unit 4 (FIG. 3: S303, S304; FIG. 4C). As shown in FIG. 4C, the mail reception history list displays concise information such as the date, sender ("From"), title ("Title") and the like.

Figure 4D:
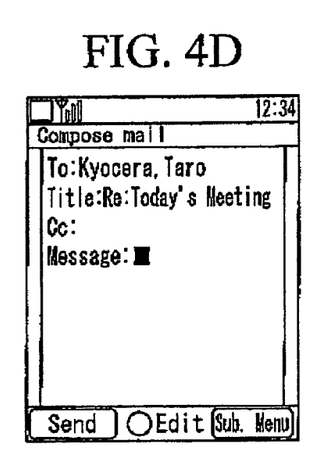

Next, when the user composes a reply mail to reply to one of the displayed received mails, the user operates the 3-directional lever key 5a and positions the cursor on the mail to be replied to. In this state the portable telephone is placed into an open state. When opening and closing detecting unit 7 detects that the portable telephone is open, it outputs a signal to control unit 3. When control unit 3 receives the signal from opening and closing detecting unit 7, it switches the display of display unit 4 from the mail reception history list (i.e., from the viewing screen) to a reply mail composing screen (i.e., to the input screen). A reply mail may then be composed based on the mail that was selected by the cursor in the closed state (FIG. 3: S305 to S308; FIG. 4D). Here, the term "a reply mail is composed based on the mail that was selected" indicates, for example, (i) automatically inputting addresses of transmission recipients in the column for reply mail destinations (i.e., the "To:" column), (ii) automatically attaching "Re:", which has the meaning of "Reply", to the front of the recipient subject line and inputting it into the title column of the reply mail (i.e., the "Title:" column), and (iii) quoting the text of the received mail.

Figure 4E:
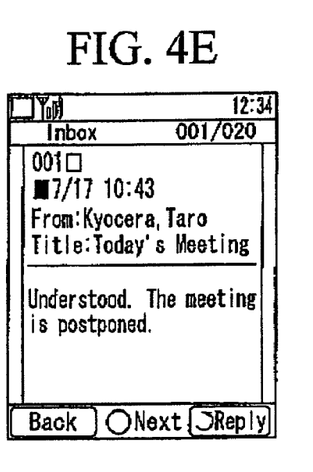
Figure 4F:
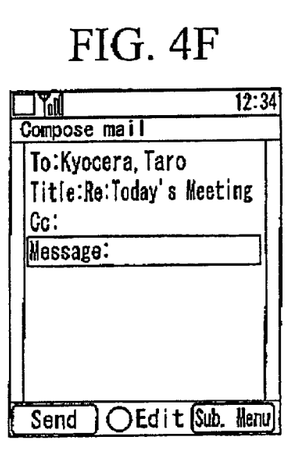

The view screen is not restricted to the reception history display described above and, for example, the screen may also show the full text. Similarly to the above, when the screen shows the full text, the reply mail is composed based on the mail that is currently being viewed (FIG. 3: S307 to S311; FIGS. 4D and 4E). The compose reply mail screen, to which the display switches from the view screen, may also be a select item screen of the compose reply mail screen, as shown in FIG. 4F.

Figure 5:
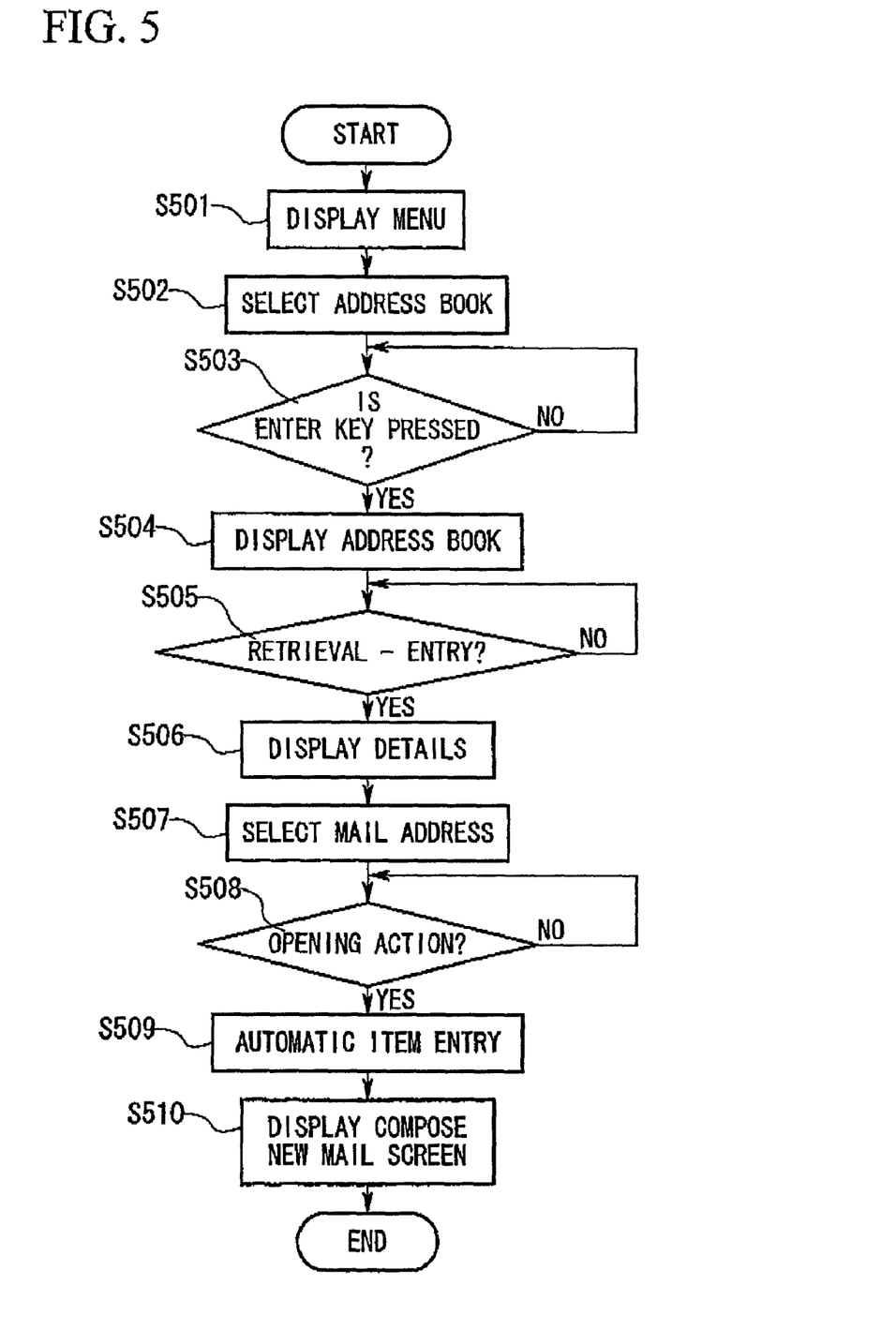
FIG. 5 is an operation flowchart for using an address book function.

Next, an example of the operation for using an address book function, that is an embodiment of the present invention, will be described in detail using the operation flowchart shown in FIG. 5 and display screen transition drawings shown in FIG. 6.

Figure 6A:
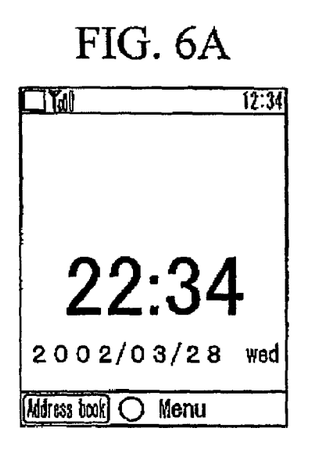
FIGS. 6A to 6F are transition diagrams of display screens displayed when an address book is being used.
Figure 6B:
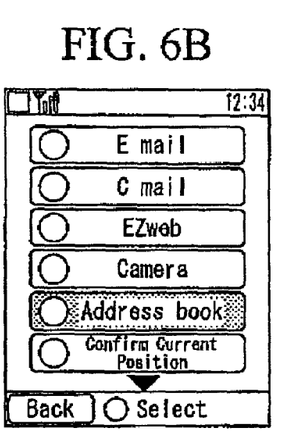
Figure 6C:
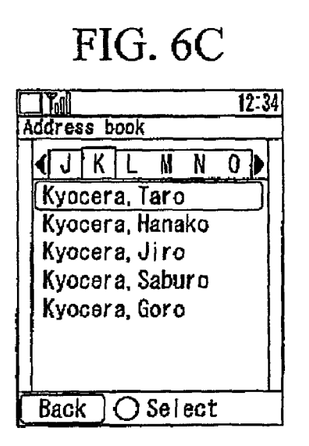
Figure 6D:
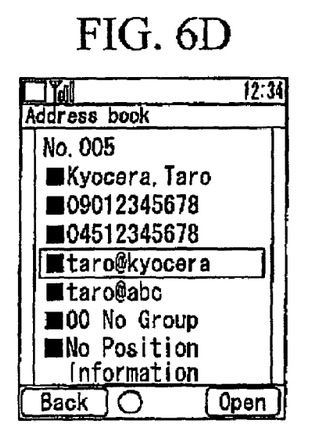

When the portable telephone is in a closed state a user may select and enter the address book function from the menu items by operating the 3-directional lever key 5a. The user then retrieves and accesses one group of data from the plurality of groups of registration data registered in the address book function (FIG. 5: S501 to S505, FIGS. 6A to 6C). When one group of data has been accessed, the details of that data (i.e., the name, telephone number, mail address, group number, position information, and the like) are displayed (FIG. 5: S506; FIG. 6D).

Figure 6E:
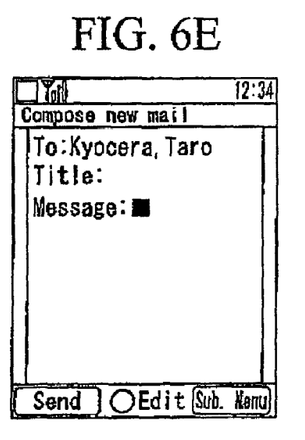

Next, when the user composes a new mail to send to a recipient whose details are currently being displayed (i.e., are currently on view), the user operates the 3-directional lever key 5a to position the cursor on the mail address to which the user wishes to send a mail. In this state, the portable telephone is placed into an open state. When opening and closing detecting unit 7 detects that the portable telephone is open, it outputs a signal to control unit 3. When control unit 3 receives the signal from opening and closing detecting unit 7, it switches the display of display unit 4 from the display address book details screen (i.e., from the viewing screen) to a new mail composing screen (i.e., to the input screen). At this time, the mail address that was selected by the cursor when the portable telephone was in a closed state is automatically input into the destination (To:) column (FIG. 5: S507 to S510; FIGS. 6D and 6E).

Note that the view screen is not restricted to the display details screen. It is also possible for the cursor to make a selection in the screen currently being retrieved (FIG. 6C). However, in this case, if the data includes a plurality of registered mail addresses, different control methods such as automatically inputting one of the plurality of registered mail addresses, requesting that for the user to select one, or inputting no mail address may be employed.

Figure 6F:
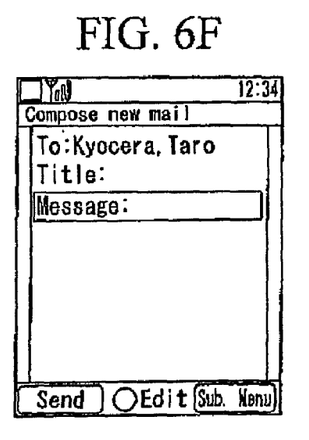

The compose new mail screen to which the display switches from the view screen may also be a select item screen of the compose new mail screen, as shown in FIG. 6F.

Next, an example of the operation for using a schedule function, that is an embodiment of the present invention, will be described in detail using the operation flowchart shown in FIG. 7 and display screen transition drawings shown in FIG. 8.

Figure 7:
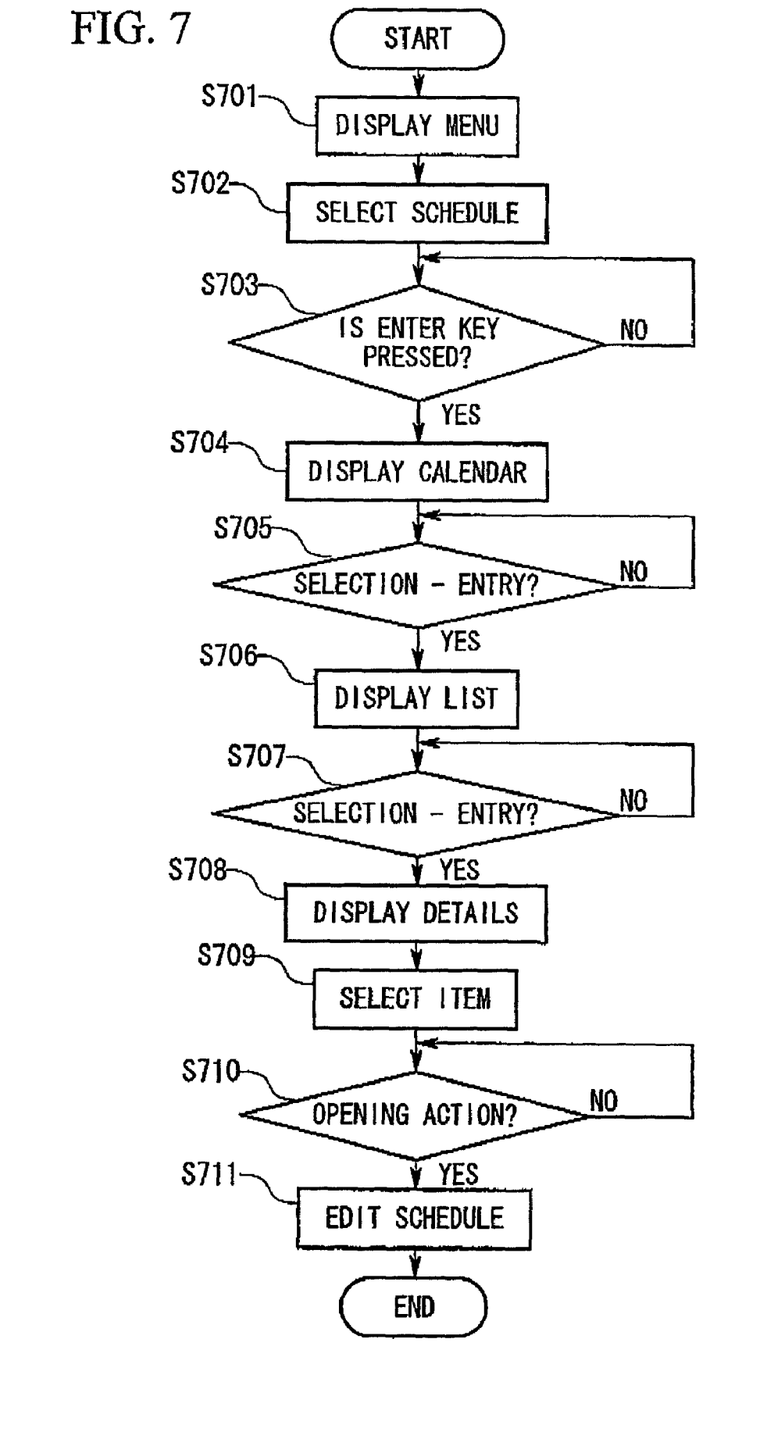
FIG. 7 is an operation flowchart for using a schedule function.
Figure 8A:
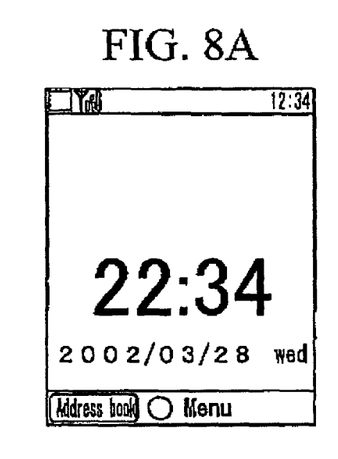
FIGS. 8A to 8H are transition diagrams of display screens displayed when a schedule is being used.
Figure 8B:
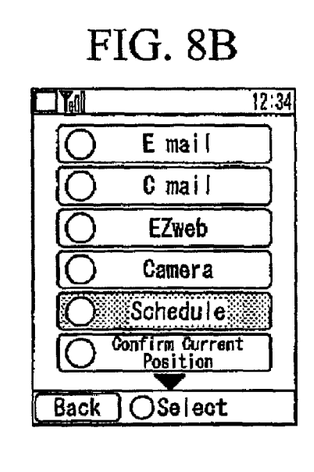
Figure 8C:
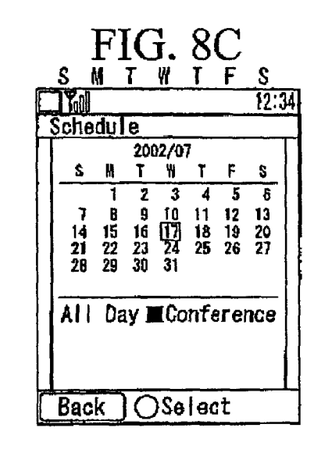
Figure 8D:
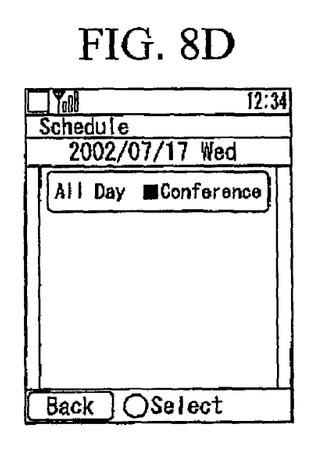
Figure 8E:
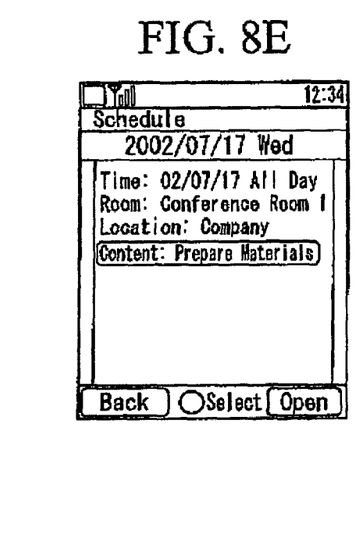

When the portable telephone is in a closed state a user may select and access the schedule function from the menu items by operating the 3-directional lever key 5a to display a calendar (FIG. 7: S701 to S704; FIGS. 8A to 8C). Next, the cursor is positioned on the date of the calendar display on which the user wishes to input a schedule item and the selection is entered. A list of schedule items already registered for the entered date are then displayed. When one of these schedule items is then selected and entered, the details thereof (i.e., time, place, contents, etc.) are displayed (FIG. 7: S705 to S708; FIGS. 8C to 8E).

Figure 8F:
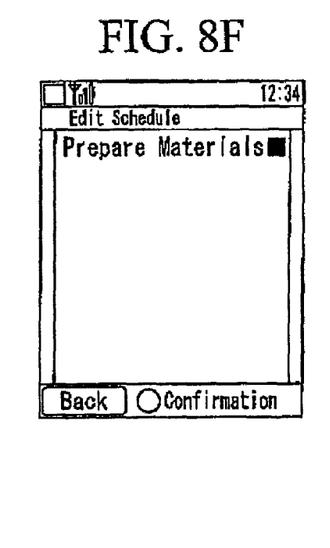
Figure 8G:
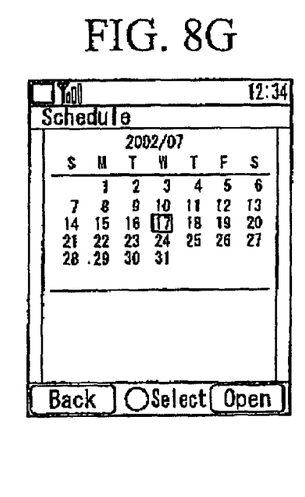
Figure 8H:
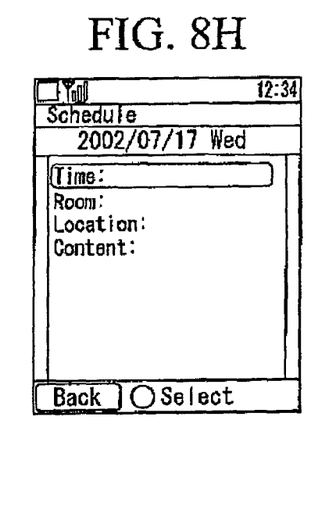

Next, to edit the contents of the registration data that has been registered, the 3-directional lever key 5a is operated to position the cursor on the item the user wishes to edit. In this state, the portable telephone is placed in an open state. When opening and closing detecting unit 7 detects that the portable telephone is open, it outputs a signal to control unit 3. When control unit 3 receives the signal from opening and closing detecting unit 7, it switches the display of display unit 4 from the display schedule details screen (i.e., from the viewing screen) to edit schedule screen (i.e., to the input screen) (FIG. 7: S709 to S711; FIGS. 8D to 8F). Note that the view screen is not restricted to the display details screen, and it is also possible for the cursor to select a date in the calendar display screen (FIG. 8G). However, in this case, if schedule items are already registered the display switches to the edit screen (FIG. 8E or FIG. 8F). If schedule items are not already registered, the select item screen of the compose new schedule screen (FIG. 8H) is preferably displayed.

Next, an example of the operation for using a memo pad function, that is an embodiment of the present invention, will be described in detail using the operation flowchart shown in FIG. 9 and display screen transition drawings shown in FIG. 10.

Figure 9:
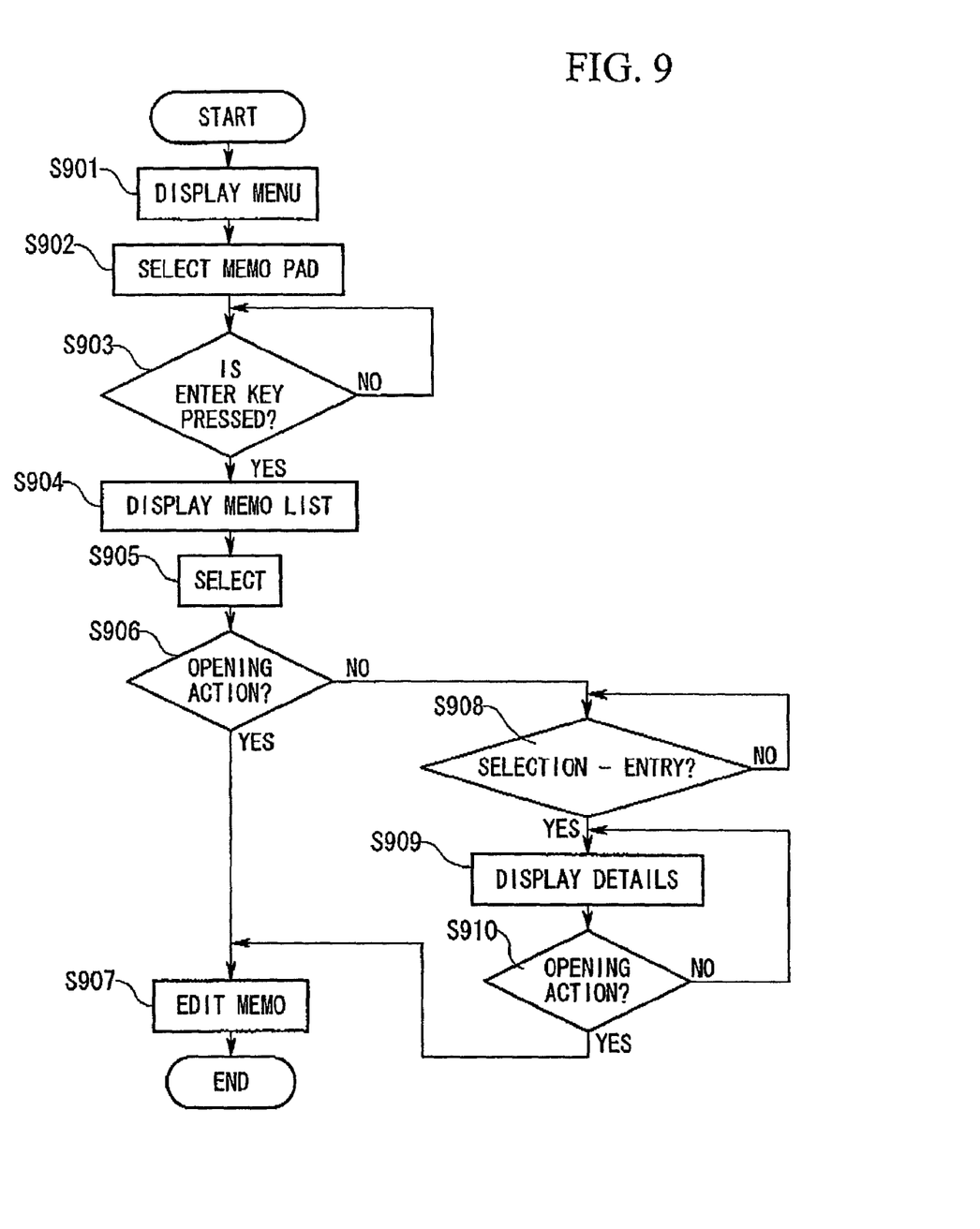
FIG. 9 is an operation flowchart for using a memo pad function.
Figure 10A:
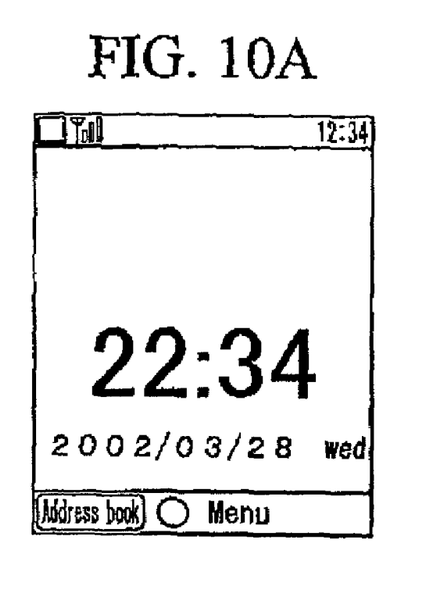
FIGS. 10A to 10D are transition diagrams of display screens displayed when a memo pad is being used.
Figure 10B:
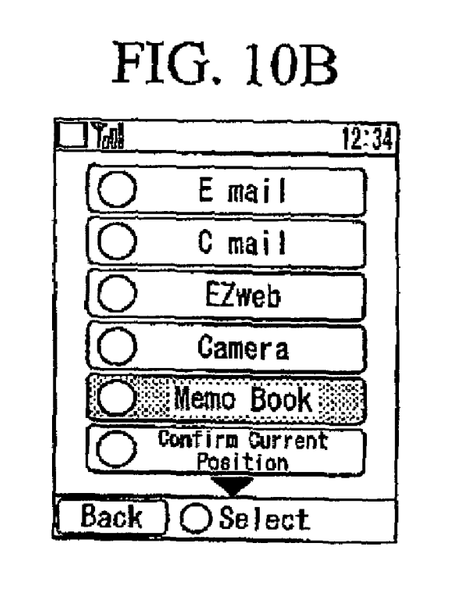
Figure 10C:
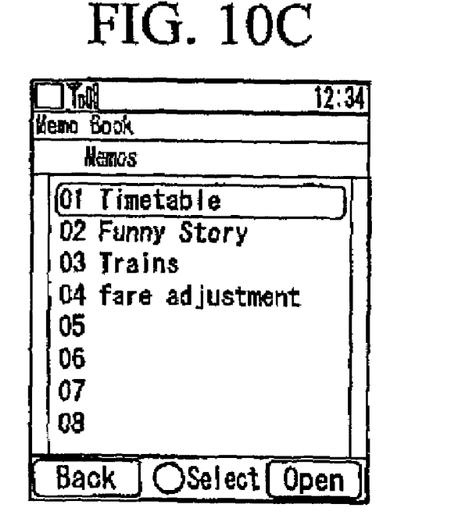
Figure 10D:
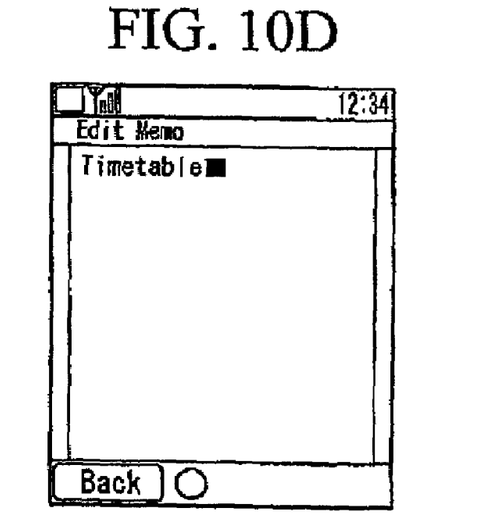

When the portable telephone is in a closed state, a user may select and enters the memo pad function from the menu items by operating the 3-directional lever key 5a or the like, thereby displaying a memo pad list (FIG. 9: S901 to S904; FIGS. 10A to 10C). Next, if the user wishes to edit the content of registration data that has been registered, he/she may position the cursor on the title that the user wishes to edit in the displayed list. In this state, the portable telephone is placed into an open state. When opening and closing detecting unit 7 detects that the portable telephone is open, it outputs a signal to control unit 3. When control unit 3 receives the signal from opening and closing detecting unit 7, it switches the display of display unit 4 from the display memo pad list screen shown in FIG. 10C (i.e., from the viewing screen) to an edit memo pad screen (i.e., to the input screen) shown in FIG. 10D (see also, FIG. 9: S905 to S907). A list of registered memo pad items is then displayed and, when one of these is selected and entered, the content thereof is displayed. Similarly to the above described operations, in this state, if the portable telephone is placed into an open state, opening and closing detecting unit 7 detects that the portable telephone is open. Control unit 3 then switches the display of display unit 4 from the display memo pad content screen (i.e., from the viewing screen) to the edit memo pad screen (i.e., to the input screen) (FIG. 9: S907 to S910).

Note that the term "input screen" indicates a screen (as shown, for example, in FIGS. 4F, 6F, and 8H) used to input characters, symbols, numerals, and the like using operating keys 5c after selecting an input item such as the "compose reply mail" screen, "compose new mail" screen, "compose new schedule" screen, "edit" screen, "input password" screen (not shown), and the like. However, it may also be a screen (as shown, for example, in FIGS. 4D, 6E, 8F, and 10D) where an item has already been selected and the input position is shown by the cursor.

A screen that corresponds to input of the operation unit (i.e., operating keys 5c) that is exposed by the opening action to open the portable telephone is the one that allows the cursor to be moved and characters and the like to be input in response to an input operation of operating keys 5c. Examples thereof are the screens shown in FIGS. 4D, 6E, 8F, and 10D.

Note that "view mode" indicates a mode for viewing information such as menu items, list displays, calendar displays, detail displays, Web displays, and the like, and, in particular, indicates use when the portable telephone is in a closed state. Furthermore, "input mode" indicates a mode requiring the input of characters, symbols, numerals, and the like such as "compose new", "compose reply mail", edit", and the like, and, in particular, indicates use when the portable telephone is in the closed state.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A portable terminal having an open state and a closed state, said portable terminal comprising:
   a first housing having a main display unit with a screen;
   a second housing having at least an input unit;
   a detecting unit for detecting opening of either of said first and second housings; and
   a control unit for controlling said screen of said main display unit;
   wherein said first housing is openably and closably connected to said second housing, wherein said main display unit is disposed in an outside surface of said first housing which is opposite to an inside surface of said first housing that faces said second housing in said closed state, and is visible to a user in at least said closed state of said portable terminal, and wherein, when said detecting unit detects opening of either of said first and second housings, said control unit changes a non-input screen of an item to be displayed on said main display unit in the closed state to an input screen corresponding to said item.

2. The portable terminal according to claim 1 further comprising:
   a selecting unit for selecting an item displayed on said main display unit, wherein when said detecting unit detects opening of either of said housings, said control unit changes said screen with an item selected by said selecting unit to an input screen corresponding to said item.

3. The portable terminal according to claim 1, wherein said portable terminal is a personal digital assistant.

4. The portable terminal according to claim 1, wherein said portable terminal is a portable telephone.

5. The portable terminal according to claim 1, wherein said input unit is disposed in said second housing in such a manner that said input unit is not exposed outside in said closed state and is exposed outside in said open state, and said input screen is a screen which enables a user to perform an input operation using said input unit.

6. A portable terminal having a closed state and an open state, said portable terminal comprising:
   a first housing having a main display unit with a screen;
   a second housing having at least an input unit;
   a detecting unit for detecting opening of either of said first and second housings; and
   a control unit for controlling said screen of said main display unit;
   wherein said first and said second housings are openably and closably connected together, wherein said main display unit is disposed in an outside surface of said first housing which is opposite to an inside surface of said first housing that faces said second housing in said closed state visible to a user in said closed state and in said open state of said portable terminal, wherein said input unit is visible to a user in said open state, and wherein, when said detecting unit detects opening of either of said first and second housings, said control unit changes a non-input screen of an item to be displayed on said main display unit in the closed state to an input screen corresponding to said item.

7. The portable terminal according to claim 6, wherein said portable terminal is a personal digital assistant.

8. The portable terminal according to claim 6, wherein said portable terminal is a portable telephone.

9. A portable terminal having a closed state and an open state, said portable terminal comprising:
   a first housing having a main display unit, said main display unit being switchable between an input mode and a non-input mode;
   a second housing having at least an input unit;
   a detecting unit for detecting opening of either of said first and second housings; and
   a control unit for switching said display unit between said non-input mode and said input mode;
   wherein said first and second housings are openably and closably connected together, wherein said main display unit is disposed in an outside surface of said first housing which is opposite to an inside surface of said first housing that faces said second housing in said closed state, and is visible to a user in said closed state of said portable terminal, and wherein when said detecting unit detects opening of either of said first and second housings, said control unit switches said main display unit from said non-input mode in the closed state to said input mode in the open state.

10. A portable terminal having a closed state and an open state, said portable terminal comprising:
    a first housing having a main display unit, said main display unit including a screen changeable between an input screen and a non-input screen;
    a second housing having at least an input unit;
    a detecting unit for detecting opening of either of said first and second housings;
    a reception unit for receiving an electronic mail message; and
    a control unit for selectively displaying said received electronic mail message on said screen of said main display unit and for changing said screen of said main display unit;
    wherein said first and second housings are openably and closably connected together, wherein said main display unit is disposed in an outside surface of said first housing which is opposite to an inside surface of said first housing that faces said second housing in said closed state, and is visible to a user in said closed state, and wherein when said detecting unit detects opening of either of said first and second housings, said control unit changes said non-input screen displaying said received e-mail to said input screen for editing based on said received e-mail.

11. The portable terminal according to claim 10, wherein said control unit changes said non-input screen displaying said received e-mail to said input screen and displays said received e-mail on said input screen.

12. A method of displaying an input screen of a display unit of a portable terminal having a first housing and a second housing openably and closably connected together, said main display unit disposed in an outside surface of said first housing which is opposite to an inside surface of said first housing that faces said second housing in a closed state of said first and second housings, the method comprising the steps of:
    selecting an item to be displayed on said main display unit while said portable terminal is in said closed state; and
    changing a non-input screen of said main display unit having an item selected thereon to an input screen corresponding to said selected item when either of said first and second housings is opened from said closed state.

13. The method according to claim 12, wherein said non-input screen has a guide view informing a user to open either of said housings from said closed state.

14. A method of displaying an input screen of a main display unit of a portable terminal having a first housing and a second housing openably and closably connected together, said main display unit disposed in an outside surface of said first housing which is opposite to an inside surface of said first housing that faces said second housing in a closed state of said first and second housings, the method comprising the steps of:
   receiving an electronic mail message;
   displaying said received electronic mail message on a non-input screen of said main display unit; and
   changing said non-input screen displaying said received electronic mail message to an input screen for editing based on said received electronic mail message when either of said first and second housings is opened from said closed state.

15. The method according to claim 14, wherein said non-input screen has a guide view informing a user to open either of said housings from said closed state.

16. A portable terminal having an open state and a closed state, said portable terminal comprising:
   a first housing having a main display unit with a screen;
   a second housing having an input unit;
   a detecting unit for detecting opening of either of said first and second housings; and
   a control unit for controlling said screen of said main display unit;
   wherein said first housing is openably and closably connected to said second housing, wherein said main display unit is disposed in an outside surface of said first housing which is opposite to an inside surface of said first housing that faces said second housing in said closed state, and is visible to a user in at least said closed state of said portable terminal, and wherein, when said detecting unit detects opening of either of said first and second housings, said control unit changes said screen of said main display unit to an input screen.

17. A portable terminal having a closed state and an open state, said portable terminal comprising:
   first housing having a main display unit with a screen;
   a second housing having an input unit;
   a detecting unit for detecting opening of either of said first and second housings; and
   a control unit for controlling said screen of said main display unit;
   wherein said first and said second housings are openably and closably connected together, wherein said main display unit is disposed in an outside surface of said first housings which is opposite to an inside surface of said first housing that faces said second housing in said closed state, and is visible to a user in said closed state and in said open state of said portable terminal, wherein said input unit is visible to a user in said open state, and wherein, when said detecting unit detects opening of either of said first and second housings, said control unit changes said screen of said main display unit to an input screen.

18. A portable terminal having a closed state and an open state, said portable terminal comprising:
   a first housing having a main display unit, said main display unit being switchable between an input mode and a non-input mode;
   a second housing having an input unit;
   a detecting unit for detecting opening of either of said first and second housings; and
   a control unit for switching said main display unit between said non-input mode and said input mode;
   wherein said first and said second housings are openably and closably connected together, wherein said main display unit is disposed in an outside surface of said first housing which is opposite to an inside surface of said first housing that faces said second housing in said closed state and is visible to a user in said closed state of said portable terminal, and wherein when said detecting unit detects opening of either of said first and second housings, said control unit switches said main display unit from said non-input mode to said input mode.

19. A portable terminal having a closed state and an open state, said portable terminal comprising:
   a first housing having a main display unit, said main display unit with a screen changeable between an input screen and a non-input screen;
   a second housing having an input unit;
   a detecting unit for detecting opening of either of said first and second housings; and
   a control unit for selectively displaying received electronic mail message on said screen of said main display unit and for changing said screen of said main display unit;
   wherein said first and second housings are openably and closably connected together, wherein said main display unit is disposed in an outside surface of said first housing which is opposite to an inside surface of said first housing that faces said second housing in said closed state, and is visible to a user in said closed state, and wherein when said detecting unit detects opening of either of said first and second housings, said control unit changes said non-input screen displaying said received e-mail to said input screen for editing based on said received e-mail.

\* \* \* \* \*